United States Patent
Sugahara et al.

(10) Patent No.: US 11,047,754 B2
(45) Date of Patent: Jun. 29, 2021

(54) PHYSICAL QUANTITY MEASURING DEVICE

(71) Applicant: NAGANO KEIKI CO., LTD., Tokyo (JP)

(72) Inventors: Yuri Sugahara, Tokyo (JP); Yasuhisa Tanaka, Tokyo (JP); Hiroyuki Toba, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 224 days.

(21) Appl. No.: 16/448,573

(22) Filed: Jun. 21, 2019

(65) Prior Publication Data

US 2020/0003647 A1     Jan. 2, 2020

(30) Foreign Application Priority Data

Jun. 27, 2018   (JP) .............................. JP2018-122294

(51) Int. Cl.
  *G01L 19/00*   (2006.01)
  *G01L 19/14*   (2006.01)

(52) U.S. Cl.
  CPC ........ *G01L 19/0084* (2013.01); *G01L 19/143* (2013.01); *G01L 19/147* (2013.01); *G01L 19/148* (2013.01)

(58) Field of Classification Search
  CPC . G01L 19/0084; G01L 19/143; G01L 19/147; G01L 19/148
  See application file for complete search history.

(56) References Cited

U.S. PATENT DOCUMENTS 6,511,337 B1 *   1/2003   Fandrey ............... H05K 7/1462
                                                            439/206
7,367,233 B2 *   5/2008   Nagasawa ............ G01L 9/006
                                                            73/715
2009/0154073 A1 *   6/2009   Wu ........................ G01L 19/14
                                                            361/679.01

FOREIGN PATENT DOCUMENTS

| JP | H08-043231 | 2/1996 |
| JP | 2003-014550 | 1/2003 |
| JP | 5716028 | 5/2015 |

OTHER PUBLICATIONS

Japanese Office Action dated Feb. 9, 2021, 1 page.
European Search Report dated Nov. 11, 2019, 5 pages.

* cited by examiner

*Primary Examiner* — Jamel E Williams
(74) *Attorney, Agent, or Firm* — Rankin, Hill & Clark LLP

(57) ABSTRACT

A physical-quantity-measuring device includes: an outer-case including a bottom and a cylindrical body; a synthetic-resin-made inner-case provided inside the outer-case; a detector that detects a physical quantity; a terminal base including a terminal for transmitting a signal from the detector outward; a cover covering an opening of the outer-case and being different in hardness from the inner-case; a cable whose first end is connected to the terminal; and a cylindrical-cable-drawing portion drawing a second end of the cable and projecting from a circumferential surface of the outer-case. The inner case includes: a case threaded-portion; and a terminal-base-setting portion on which the terminal base is set. The detector includes: a bottom connector connected to the bottom; and a joint attachable to a target. The cover includes: a cover body covering the terminal-base-setting portion; and a cover threaded-portion provided to the cover body and screwable with the case threaded-portion.

9 Claims, 5 Drawing Sheets

PHYSICAL QUANTITY MEASURING DEVICE

The entire disclosure of Japanese Patent Application No. 2018-122294 filed Jun. 27, 2018 is expressly incorporated by reference herein.

TECHNICAL FIELD

The present invention relates to a physical quantity measuring device configured to measure a pressure and other physical quantities.

BACKGROUND ART

A pressure gauge and other physical quantity measuring devices are used for measuring physical quantities such as pressure.

A physical quantity measuring device including a hermetically sealed housing has been known in order to detect, measure, manage and control processes in industrial process equipment.

A typical device in this type is exemplified by an industrial process transmitter including: a cylindrical housing body; first and second stainless-steel-made covers respectively engageable with both ends of the housing body; and a conduit and a neck provided on a circumferential surface of the housing body (Patent Literature 1: Japanese Patent No. 5716028).

In the typical device of Patent Literature 1, the housing body has a double-layered structure including: an inner cylindrical chassis made of aluminum; and a cylindrical outer plate made of stainless steel. The neck partially contains a sensor and is fixed to an attachment target of a pipe or the like through which a measurement target fluid flows, thereby supporting the rest of the industrial process transmitter except the neck. The conduit partially houses field wiring that can electrically connect a field terminal circuitry within the housing body to an external device. A cover screwed with an end of the chassis is removed. An end of the field wiring introduced from the conduit is connected to the field terminal circuitry. Subsequently, the cover is screwed with the end of the chassis.

In the typical device of Patent Literature 1, since the neck is provided on the circumferential surface of the housing body, the cover is to be removed from or attached to the housing body in a direction orthogonal to an axial direction of the neck.

In the connecting operation of the field wiring to the field terminal circuitry, when the neck is short, a pipe and the like present at a base of the neck disturb the operation.

When the neck is elongated in order to avoid the pipe and the like from disturbing the operation, the device is not stably supported.

Moreover, in the typical device of Patent Literature 1, the chassis is made of aluminum in order to provide a complicated structure, and the outer plate and the cover are made of stainless steel in order to obtain corrosion resistance. However, since all of the chassis, the outer plate and the cover are metallic, scoring may occur when the cover is screwed with the chassis, which also complicates the wiring operation.

SUMMARY OF THE INVENTION

An object of the invention is to provide a physical quantity measuring device capable of easily connecting a cable with a terminal of a terminal base.

According to an aspect of the invention, a physical quantity measuring device includes: an outer case comprising a bottom and a cylindrical body provided to a peripheral portion of the bottom; an inner case that is made of a synthetic resin and is provided inside the outer case; a detector that is provided to the bottom and configured to detect a physical quantity; a terminal base comprising a terminal configured to transmit a signal from the detector to an outside; a cover configured to cover an opening of the outer case and having a different hardness from that of the inner case; a cable having a first end connected to the terminal and a second end; and a cylindrical cable drawing portion drawing out the second end of the cable and projecting from a circumferential surface of the outer case, the inner case including: a case threaded portion; and a terminal base setting portion on which the terminal base is set, the detector including: a bottom connector connected to the bottom; and a joint attachable to an attachment target, and the cover including: a cover body configured to cover the terminal base setting portion; and a cover threaded portion provided to the cover body and configured to be screwed with the case threaded portion.

In the above aspect, while the cover is detached from the inner case, the first end of the cable is inserted into the cable drawing portion and is connected to the terminal of the terminal base. Subsequently, the cover threaded portion is screwed with the case threaded portion of the inner case. The connecting operation of the cable to the terminal thus ends.

Accordingly, since the cover is disposed opposite from the detector across the outer case and the inner case, the outer case is open to a side opposite from the attachment target when the cover is detached. Accordingly, in the connecting operation of the cable to the terminal, no obstacle (e.g., the attachment target) to the connecting operation is present around the opening of the outer case. Further, since the inner case is made of synthetic resin, the inner case can be easily formed by injection molding or the like such that the terminal base is located close to the opening of the outer case, thus allowing easy connection of the cable. Further, since the inner case having the case threaded portion is made of synthetic resin and the cover having the cover threaded portion is different in hardness from the inner case, scoring is less likely to occur when the cover is screwed with the inner case. Accordingly, since disadvantages concurring with the scoring when the cover is fastened are avoidable, the cable can be easily connected to the terminal.

In the above arrangement of the invention, the detector may be attached to the attachment target while the joint is located at a lower position and the bottom connector is located at a higher position, and the cable drawing portion may be attached to the outer case in a manner to be inclined downward from a base end to a distal end thereof.

In this arrangement, since the cable drawing portion is inclined downward toward the distal end, water is unlikely to enter the inside of the outer case from an opening at the distal end of the cable drawing portion, so that water can be prevented from entering the outer case.

In the above arrangement of the invention, the inner case and the outer case may define a space therebetween, and a seal member may be located surrounding a communication hole that communicates with the bottom connector formed on the bottom.

In this arrangement, even if water is generated due to dew condensation in the space, or even if unexpectedly entering water passes through the space to accumulate on the bottom of the outer case, since the seal member is disposed on the bottom in a manner to surround the communication hole, water can be prevented from entering the bottom connector through the communication hole.

In the above arrangement of the invention, the seal member may have an annular gasket located adjacent to the communication hole.

In this arrangement, prevention of water from entering the bottom connector can be reliably achieved with such a simple structure as the gasket.

In the above arrangement of the invention, the inner case may have a guide configured to guide a first end of the cable from an inside of the cable drawing portion to the terminal.

In this arrangement, when the cable is pushed into the inside of the inner case from the cable drawing portion, the first end of the cable is guided by the guide to be transferred to the terminal, so that the cable can be easily connected to the terminal.

In the above arrangement of the invention, the detector may include: a cylindrical case having a first end provided to the bottom connector and a second end provided to the joint; a sensor that is provided to the joint and is configured to detect a physical quantity of a measurement target fluid to be introduced from an introduction port formed on the joint; and a circuit board that is provided inside the cylindrical case and is configured to receive a detection signal from the sensor and transmit the detection signal to the terminal.

In this arrangement, the physical quantity measuring device is attached to the attachment target via the joint. In this arrangement, when the measurement target fluid is introduced to the sensor through the introduction port of the joint, the sensor detects the physical quantity of the measurement target fluid. The detection signal of the physical quantity outputted by the sensor is transmitted to the terminal through the circuit board, and then transmitted from the terminal through the cable to the outside.

Since the joint, the sensor and the circuit board are provided in the cylindrical case, the detector can be compact in size.

In the above arrangement of the invention, the outer case, the cable drawing portion and the cylindrical case may be metallic, an O-ring may be provided between the cover and the inner case, and the outer case may be welded to the cylindrical case and the outer case may be welded to the cable drawing portion.

In this arrangement, since the inside of the device is covered with the metallic components, the device has a rigid structure. Since the O-ring is provided between the cover and the inner case, the device has a water-proof structure.

Herein, the welding is exemplified by laser welding, electron beam welding, TIG (tungsten inert gas) welding, brazing and soldering.

In the above arrangement of the invention, the cover body may be connected to the cable drawing portion with a chain.

In the arrangement, since the cover body is connected to the cable drawing portion with the chain, the cover can be prevented from dropping off.

In the above arrangement of the invention, the chain includes: a chain body including a first end connected to the cable drawing portion and a second end; a first engaging portion connected to the second end of the chain body; and a ring connected to the first engaging portion, and the ring includes: an elastic arc portion that is engageable with a groove formed along a circumferential direction of the cover body; and second engaging portions that are respectively provided to open ends of the arc portion and are engageable with the first engaging portion.

In this arrangement, in order to connect the cable to the terminal, the cover is rotated in one direction to be attached to the inner case or in the reverse direction to be removed from the inner case. At this time, since the ring engaged with the first engaging portion at the second end of the chain is provided, not at the top of the cover body, but along the circumferential direction of the cover body, the cover can be held with the entire flat of a hand. Moreover, since the arc portion forming the ring remains engaged with the groove formed along the circumferential direction of the cover body, when the cover is rotated, the arc portion spins free in the groove against an elastic force, thereby reducing tangling of the chain. Accordingly, the cover can be easily attached to and removed from the inner case.

BRIEF DESCRIPTION OF DRAWING(S)

DESCRIPTION OF EMBODIMENT(S)

An exemplary embodiment of the invention will be described with reference to the attached drawings.

Figure 1:
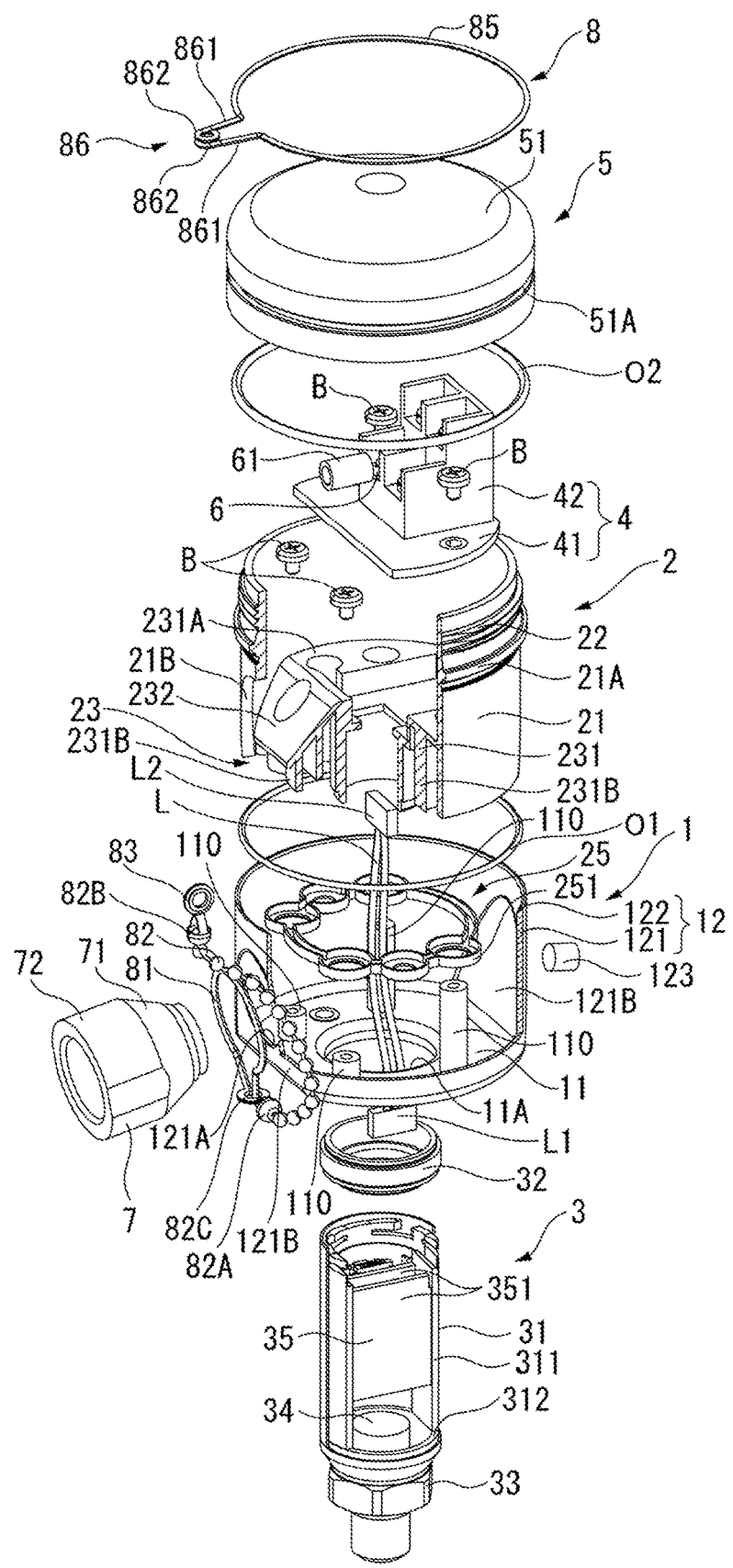
FIG. 1 is an exploded perspective view of a physical quantity measuring device in an exemplary embodiment of the invention.
Figure 2:
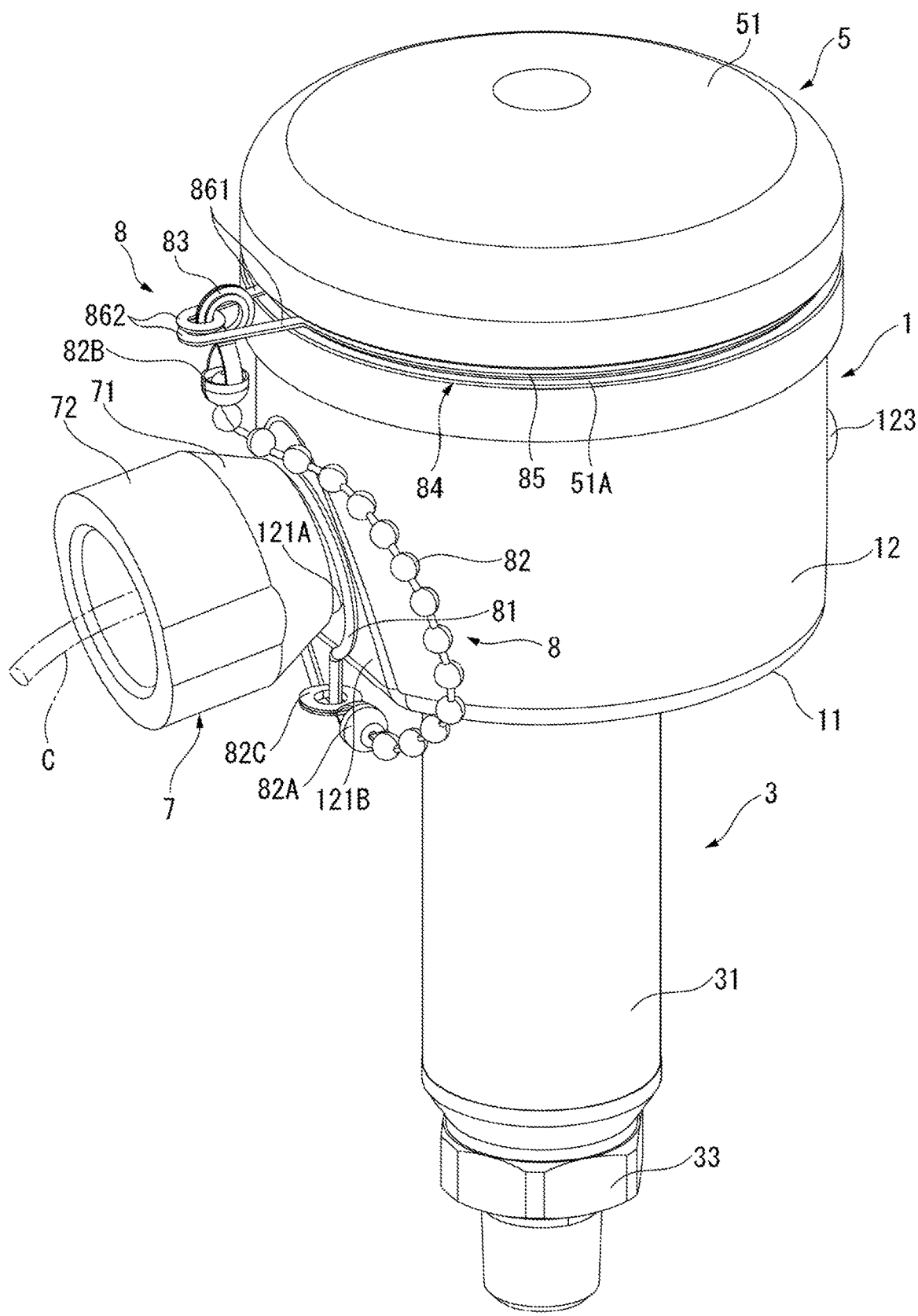
FIG. 2 is a perspective view of an entirety of the physical quantity measuring device.
Figure 3:
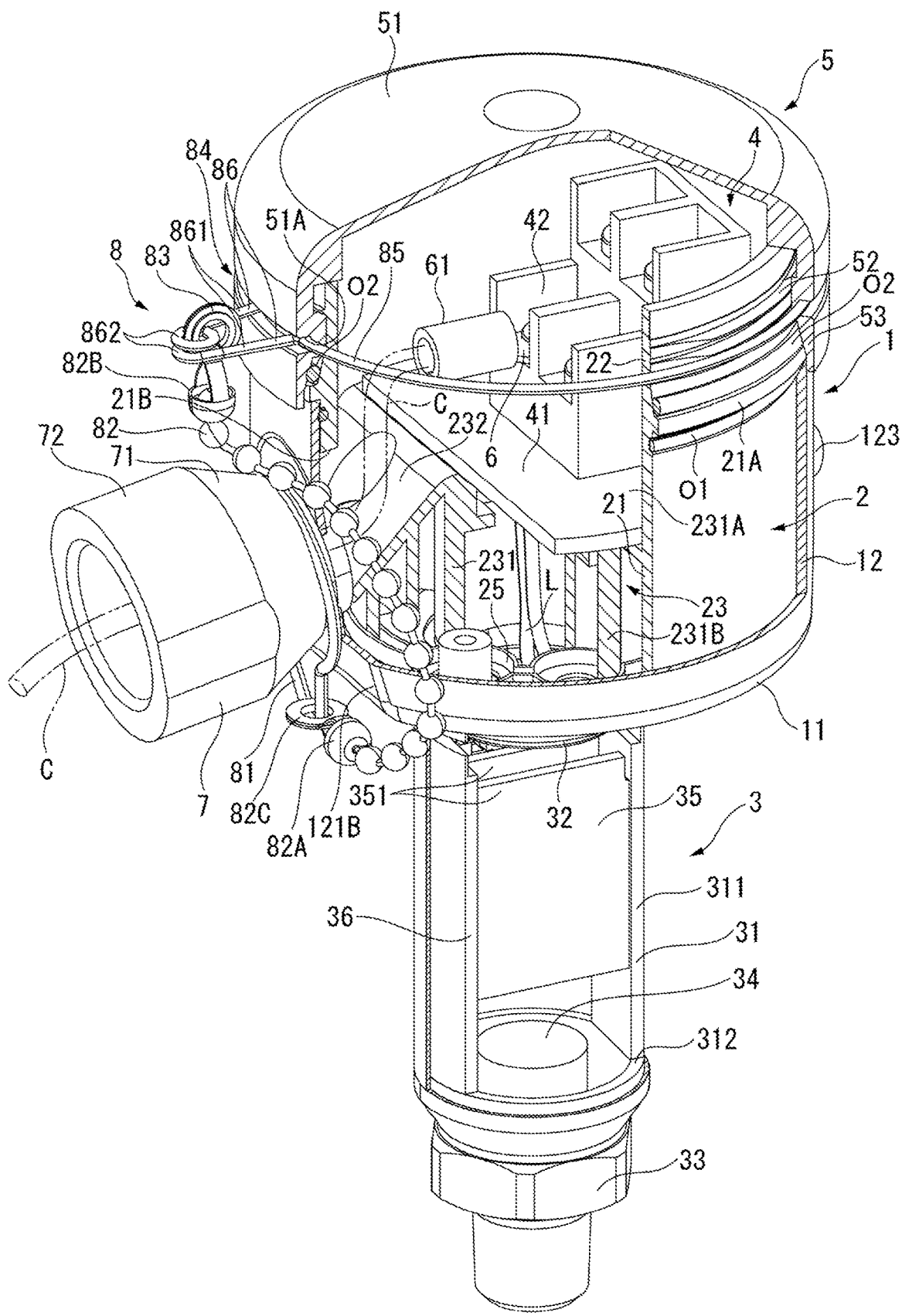
FIG. 3 is a partially cutaway perspective view of the physical quantity measuring device.

Structure of Physical Quantity Measuring Device FIGS. 1 to 3 illustrate an overall structure of a physical quantity measuring device according to the exemplary embodiment.

As shown in FIGS. 1 to 3, the physical quantity measuring device includes: an outer case 1; an inner case 2 made of a synthetic resin and provided inside the outer case 1; a detector 3 provided to the outer case 1; a terminal base 4 provided inside the inner case 2; a cover 5 that covers an opening of the outer case 1; a terminal 6 provided to the terminal base 4; a cable C having a first end connected to the terminal 6 and a second end; and a cable drawing portion 7 through which the second end of the cable C is drawn out.

The physical quantity measuring device is attached to an attachment target (e.g., a pipe (not shown)) with the detector 3 being located lower than the cover 5.

The outer case 1, which is made of metal such as stainless steel, includes a bottom 11 and a cylindrical body 12 provided to an outer peripheral portion of the bottom 11.

A communication hole 11A is formed at the center of the bottom 11. The communication hole 11A communicates an inside of the inner case 2 with an inside of the detector 3. A cord L is placed in the communication hole 11A.

The cord L, which electrically connects the detector 3 to the terminal 6, includes a connector L1 at a first end thereof and electrically connected to the detector 3, and a connector L2 at a second end thereof and electrically connected to the terminal 6.

The cylindrical body 12, which is located so as to be substantially coaxial with upper and lower components, includes a cylindrical base end portion 121 integrally formed with the bottom 11, and a distal end portion 122 integrally formed with an open end of the base end portion 121.

The base end portion 121 has at least one inclined portion 121B that is inclined such that the base end portion 121 has a larger bore at a remoter position from the bottom 11.

Two inclined portions 121B are respectively provided at both sides of the axis of the outer case 1. The first one of the inclined portions 121B has an attachment hole 121A (see FIG. 4) in which a base end of the cable drawing portion 7 is fitted. The cable drawing portion 7, which is made of metal such as stainless steel, is bonded to the base end portion 121 by welding such as laser welding, electron beam welding, TIG (tungsten inert gas) welding, brazing and soldering.

The cable drawing portion 7 has a base 71 dented toward a base end thereof, and a distal end portion 72 integrally formed with the base 71 and having an axially constant profile.

A grounding joint 123 is provided to the second one of the inclined portions 121B. The grounding joint 123 is used for grounding the detector 3.

Figure 4:
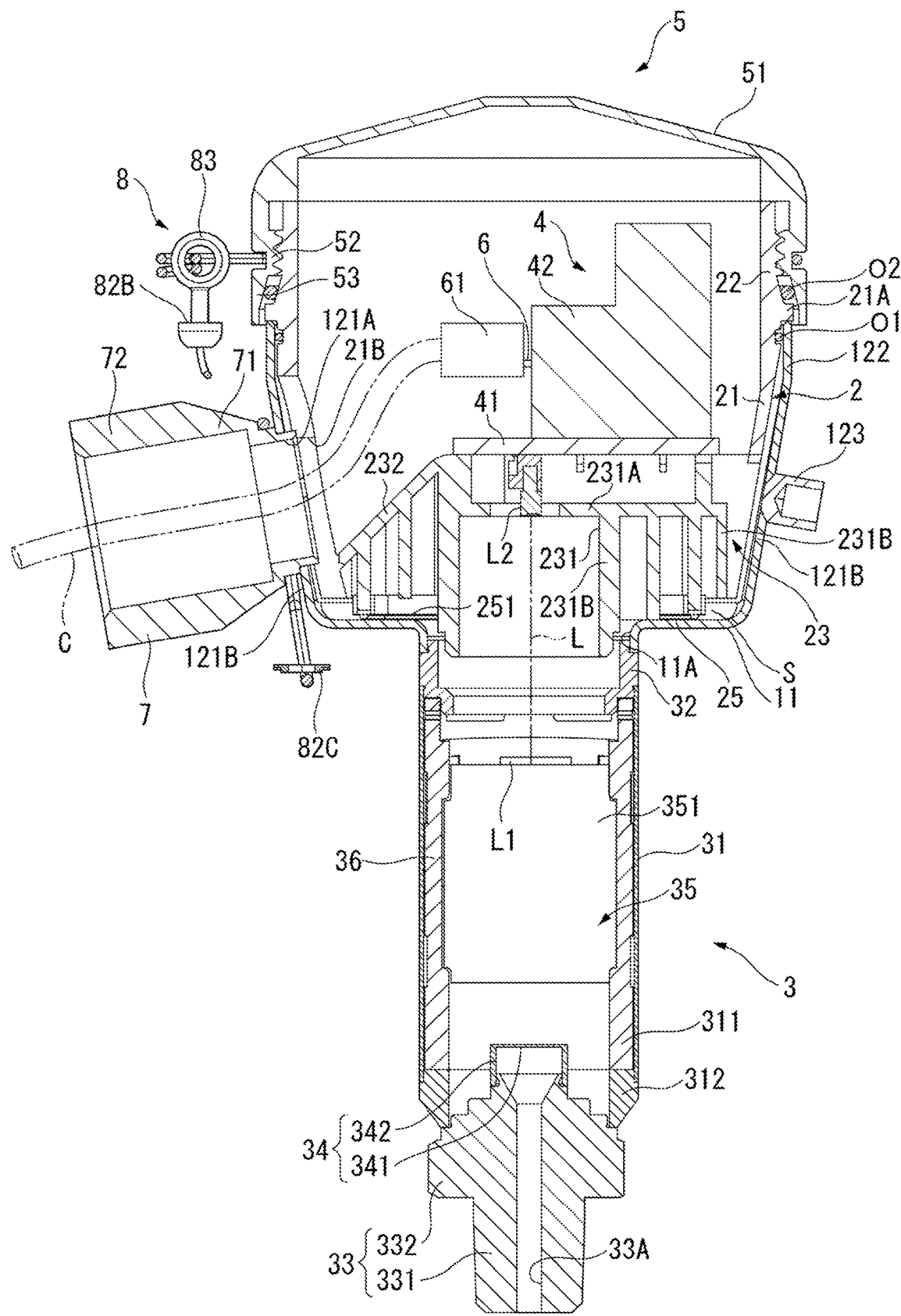
FIG. 4 is a cross-sectional view of the physical quantity measuring device.

FIG. 4 is a cross-sectional view of the physical quantity measuring device. As shown in FIGS. 1, 3 and 4, the inner case 2 includes a case body 21, a case threaded portion 22 that is formed on an upper end of the case body 21, and a terminal base setting portion 23 integrally formed with an inner circumferential surface of the case body 21.

The case body 21 has a step 21A formed close to the case threaded portion 22 along an outer circumference of the case body 21. An O-ring 01 is interposed between a lower side of the step 21A of the case body 21 and an inner circumferential portion of the cylindrical body 12. The O-ring 01 blocks water from entering the bottom of the outer case 1 through between the open ends of the outer case 1 and the inner case 2.

An opening 21B is formed on a circumferential surface of the case body 21 at a position corresponding to the base end of the cable drawing portion 7.

A space S is defined between the case body 21 and the cylindrical body 12.

The case threaded portion 22 is in a form of an external thread.

The terminal base setting portion 23, on which the terminal base 4 is set, includes: a supporting portion 231 whose lower end is supported by the bottom 11; and a guide 232 integrally formed with the supporting portion 231.

The supporting portion 231 includes: a plate 231A; and a plurality of cylindrical ribs 231B provided to a lower side of the plate 231A.

The plate 231A is attached to an attachment portion 110 formed on the bottom 11 using at least one bolt B.

A vent seal 26 that allows a flow of air and blocks a flow of water between spaces above and below the plate 231A is provided at an end of at least one of the plurality of ribs 231B. A stud (not shown) is provided to each of the rest of the ribs 231B (see FIG. 5).

A seal member 25 is disposed between the plate 231A and the bottom 11 in a manner to surround an open communication hole 11A.

Figure 5:
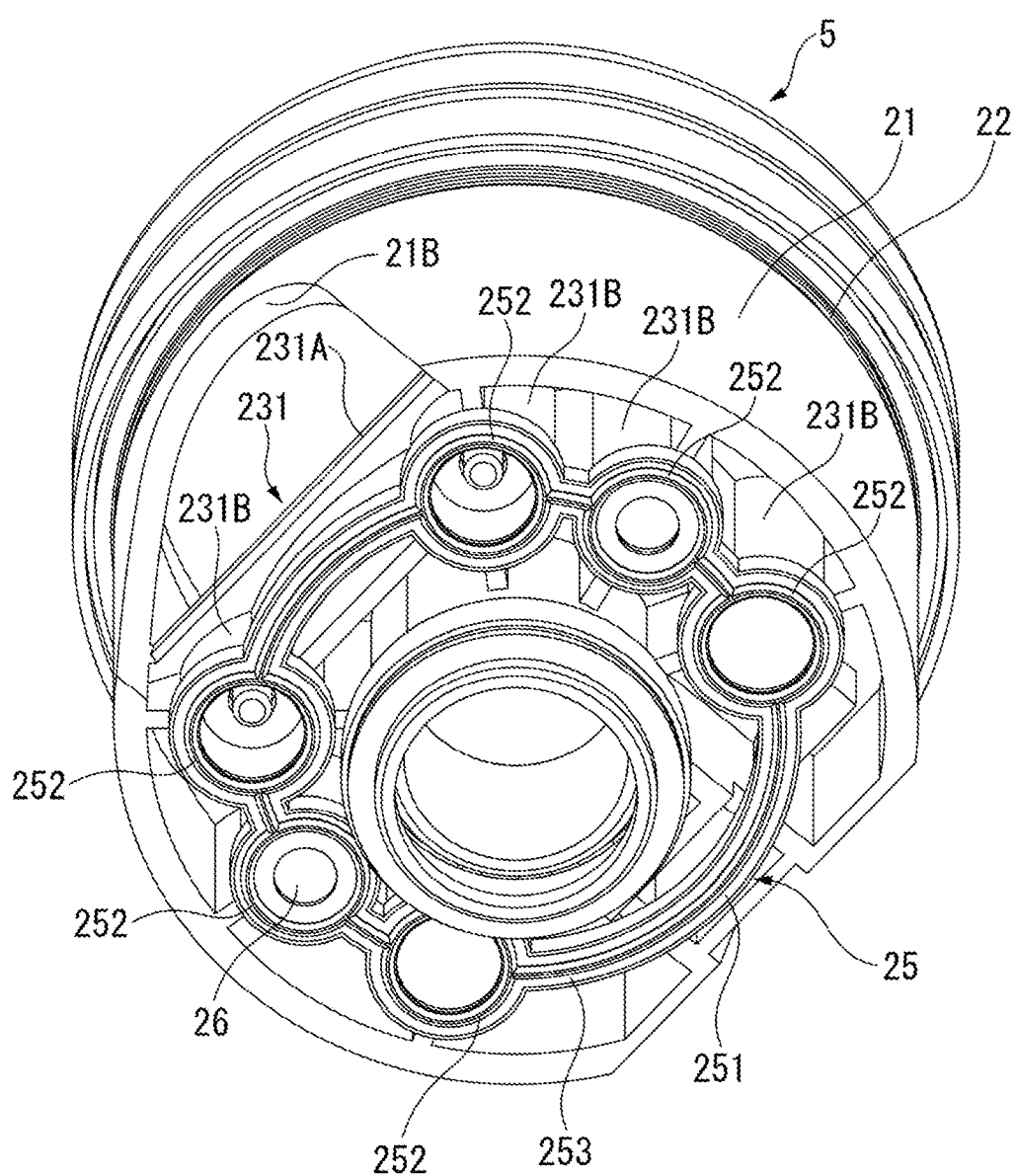
FIG. 5 is a perspective view of an inner case.

The seal member 25 is provided with an annular gasket 251 as shown in FIG. 5.

The gasket 251 blocks water from entering a bottom connector 32 (described later) even if water is generated due to dew condensation in the space S between an outer circumferential surface of the case body 21 and an inner circumferential surface of the cylindrical body 12.

The gasket 251 includes: rings 252 respectively surrounding the circumference of the plurality of ribs 231B; and a connecting portion 253 connecting the rings 252 to each other.

As shown in FIGS. 1, 3 and 4, the terminal base 4 includes: a plate 41 supported by the supporting portion 231; and a terminal base body 42 provided on the plate 41.

The plate 41 is attached to the attachment portion 110 formed on the bottom 11 using the bolt B through the supporting portion 231. The connector L2 is provided to the plate 41.

The terminal base body 42 is shaped in a step formed of a synthetic resin. The terminal 6 is attached to the step.

The terminal 6 is provided with a connector tube 61, through which the terminal 6 and the cable C are connected to each other.

The guide 232 is in a form of an inclined plate for guiding the first end of the cable C to the terminal 6 from an inside of the cable drawing portion 7. The guide 232 is integrally formed with an end of the plate 231A. A lower end of the guide 232 is adjacent to a lower open edge of the cable drawing portion 7.

The detector 3 includes: a cylindrical case 31; the annular bottom connector 32 provided to an upper end of the cylindrical case 3; a joint 33 provided to a lower end of the cylindrical case 31; a sensor 34 configured to detect a physical quantity of a measurement target fluid to be introduced from an introduction port 33A formed in the joint 33; a circuit board 35 installed inside the cylindrical case 31; and a holder 36 holding the circuit board 35.

The cylindrical case 31 includes: a case body 311; and an annular portion 312 provided to a lower end of the case body 311.

The cylindrical case 31, the bottom connector 32 and the joint 33 are made of metal such as stainless steel. Welding such as laser welding, electron beam welding, TIG (tungsten inert gas) welding, brazing and soldering is applied for bonding between the bottom 11 and the bottom connector 32, between the bottom connector 32 and the cylindrical case 31, and between the cylindrical case 31 and the joint 33.

The joint 33 includes: a shaft 331 having an introduction port 33A at the axial center thereof, through which the measurement target fluid is introduced; and a flange 332 formed to a periphery of the shaft 331.

The sensor 34 includes: a diaphragm 341 displaceable depending on a pressure of the measurement target fluid; and a cylindrical portion 342 bonded to a peripheral portion of the diaphragm 341. A strain gauge (not shown) is provided on a surface of the diaphragm 341. A detection signal detected by the strain gauge is transmitted to the circuit board 35.

The circuit board 35 includes one or two substrate body (bodies) 351 and an electronic component (not shown) provided to the substrate body 351. The connector L1 is provided to the substrate body 351. With this arrangement, the detection signal of the pressure detected by the sensor 34 is transmitted to the terminal 6 through the circuit board 35, the connector L1, the cord L and the connector L2.

The holder 36 is in a form of a synthetic-resin-made member holding both sides of the circuit board 35 with a predetermined elastic force, and is housed inside the case body 311.

The holder 36 has a locking member (not shown) for locking the circuit board 35 therein.

A lower end portion of the holder 36 is supported by the annular portion 312.

The cover 5 includes: a cover body 51 that is circular in a plan view and covers the terminal base 4; a cover threaded portion 52 provided to a peripheral edge of the cover body 51; and a cover end 53 provided to the cover 5 to be located closer to an open end of the cover 5 than the threaded portion 52 is located. The cover 5 is formed of a material such as metal, synthetic resin and ceramics. A hardness of the cover 5 is higher than that of the inner case 2.

The cover threaded portion 52 is in a form of an internal thread screwable with the case threaded portion 22.

A top of the cover body 51 projects upward. The top may be flat. The cover body 51 may be in any size. For instance, the cover body 51 may be in size enough for the top to be covered with the flat of a hand. An O-ring O2 is provided between an inner circumferential portion of the cover end 53 and the case body 21 of the inner case 2.

The cover body 51 is connected to the cable drawing portion 7 with a chain 8.

The chain 8 includes: an annular engagement portion 81 whose first end is engaged with a base end of the cable drawing portion 7; a chain body 82 whose first end is connected to the annular engagement portion 81; a first engaging portion 83 connected to a second end of the chain body 82; and a ring 84 connected to the first engaging portion 83.

The chain body 82 is formed by mutually connecting a plurality of spherical bodies in a line. The spherical body positioned at a first end of the chain body 82 is held by a holder 82A and the spherical body positioned at a second end thereof is held by a holder 82B. The holder 82A is connected to the annular engagement portion 81 through an engaging ring 82C.

The first engaging portion 83 is engaged with the holder 82B. The first engaging portion 83 is in a form of a spiral roll of a single elastic wire, in which axially adjacent parts of the first engaging portion 83 are placed one upon another. The engaging ring 82C may be formed in the same manner as the first engaging portion 83.

The ring 84 includes: an elastic arc portion 85 that is engageable with a groove 51A formed along a circumferential direction of the cover body 51; and second engaging portions 86 that are respectively provided to open ends of the arc portion 85 and are engageable with the first engaging portion 83. The ring 84 is formed by bending a single wire.

Each of the second engaging portions 86 includes: a linear portion 861 angularly formed to each of the open ends of the arc portion 85; and an annular portion 862 integrally formed with an end of each of the linear portions 861.

Two annular portions 862 can be placed one upon another against an elastic force of the arc portion 85. The first engaging portion 83 is engaged with the annular portions 862 placed one upon another. In order to engage the first engaging portion 83 with the annular portions 862, the annular portions 862 are pushed between layered parts at the end of the first engaging portion 83.

Connection Method of Cable

Next, a method of connecting the cable C to the physical quantity measuring device will be described.

Firstly, the cover 5 is removed from the inner case 2. Since the cover 5 removed from the inner case 2 has been connected to the cable drawing portion 7 with the chain 8, the cover 5 will not be lost.

In this state, a first end of the cable C is pushed into the cable drawing portion 7. The first end of the cable C pushed into the cable drawing portion 7 contacts with the guide 232 and is guided along an inclined surface of the guide 232 to a vicinity of the terminal 6.

When the first end of the cable C comes to the vicinity of the terminal 6, the first end of the cable C is connected to the terminal 6 provided to the terminal base 4.

Subsequently, in order to attach the cover 5 to the inner case 2 holding the O-ring O2, the cover 5 is rotated clockwise while being held with the entire flat of a hand, so that the cover threaded portion 52 of the cover 5 is screwed with the case threaded portion 22 of the inner case 2.

Although the rotation of the cover 5 may be restricted by the chain 8 whose first end is connected to the cable drawing portion 7, the arc portion 85 of the chain 8 spins free in the groove 51A, so that the cover 5 can be smoothly rotated.

For maintenance, the cover 5 may be rotated counterclockwise against the inner case 2 to be removed from the inner case 2. Even when the cover 5 is rotated, the arc portion 85 of the chain 8 is slid in the groove 51A of the cover body 51, so that the chain 8 is less likely to be tangled with the outer case 1.

Advantage(s) of Exemplary Embodiment(s)

The following advantages can be obtained in the exemplary embodiment.

(1) Since the cover 5 is disposed opposite from the detector 3 across the outer case 1 and the inner case 2, the outer case 1 is open to a side opposite from the attachment target when the cover 5 is detached. Accordingly, in the connecting operation of the cable C to the terminal 6, no obstacle (e.g., the attachment target) to the connecting operation is present around the opening of the outer case 1, so that the cable C can be easily connected to the terminal 6.

(2) Since the inner case 2 is made of a synthetic resin, the inner case 2 can be formed by injection molding or the like such that the terminal base 4 is located close to the opening of the outer case 1, so that the terminal 6 is located close to the opening of the outer case 1, thus also allowing easy connection of the cable C.

(3) Since the inner case 2 having the case threaded portion 22 is made of a synthetic resin and the cover 5 having the cover threaded portion 52 is made of the material harder than that of the inner case 2, scoring is less likely to occur when the cover 5 is screwed with the inner case 2. Accordingly, the cover 5 can be easily attached to the inner case 2.

(4) Since the case threaded portion 22 is the external thread and the cover threaded portion 52 is the internal thread, the cover 5 covers the peripheral portion of the inner case 2, so that water can be prevented from entering the inner case 2 through the cover 5.

(5) Since the detector 3 is vertically located with the cover 5 at a higher position and the joint 33 at a lower position and the cable drawing portion 7 is attached to the outer case 1 in a manner to be inclined downward from the base end to a distal end of the cable drawing portion 7, water is unlikely to enter the inside of the outer case 1, so that water can be prevented from entering the outer case 1.

(6) The space S is defined between the inner case 2 and the outer case 1, and the seal member 25 is disposed between the inner case 2 and the bottom 11 in a manner to surround the communication hole 11A. Accordingly, even if water is generated due to dew condensation in the space S or even if unexpectedly entering water passes through the space S to accumulate on the bottom 11 of the outer case 1, the seal member 25 can prevent water from entering the bottom connector 32 through the communication hole 11A.

(7) Since the seal member 25 has the annular gasket 251 provided adjacent to the communication hole 11A, prevention of the entering of water can be reliably achieved with such a simple structure as the gasket.

(8) Since the inner case 2 has the guide 232 for guiding the first end of the cable C from the inside of the cable drawing portion 7 to the terminal 6, when the cable C is pushed into the inside of the inner case from the cable drawing portion 7, the first end of the cable C is guided by the guide 232 to be moved to the terminal 6. Accordingly, since the first end of the cable C is located close to the terminal 6, the cable C can be easily connected to the terminal 6.

(9) Since the detector 3 includes the cylindrical case 31, the sensor 34 provided to the joint 33, and the circuit board 35 that is provided inside the cylindrical case 31 and receives the detection signal from the sensor 34 to transmit the detection signal to the terminal 6, the detector 3 can be compact in size.

(10) The outer case 1, the cable drawing portion 7 and the cylindrical case 31 are metallic. The outer case 1 is welded to cylindrical case 31 while the outer case 1 is welded to the cable drawing portion 7. Accordingly, since the inside of the device is covered with the metallic components, a rigid exterior of the device is obtainble. Since the O-ring O2 is provided between the cover 5 and the inner case 2, a water-proof structure is provided.

(11) Since the cover body 51 is connected to the cable drawing portion 7 with the chain 8, the cover 5 can be prevented from dropping off.

(12) Since the ring 84 engaged with the first engaging portion 83 at the second end of the chain 8 is provided along the circumferential direction of the cover body 51, the cover can be held with the entire flat of a hand. Moreover, since the arc portion 85 forming the ring 84 remains engaged with the groove 51A formed along the circumferential direction of the cover body 51, when the cover 5 is rotated, the arc portion 85 spins free in the groove against an elastic force, thereby reducing tangling of the chain 8.

Modification(s)

It should be understood that the scope of the invention is not limited to the above-described exemplary embodiment(s) but includes modifications and improvements as long as the modifications and improvements are compatible with the invention.

Although the detector 3 detects a pressure in the above exemplary embodiment, for instance, the detector 3 according to the invention detects physical quantities (e.g., a differential pressure, a flow rate, and a temperature) other than the pressure in some embodiments.

For instance, in some embodiments, the physical quantity measuring device according to the invention is in a form of a differential-pressure measuring device in which the joint has two introduction ports individually receiving different measurement target fluids and the detector detects a pressure difference between the measurement target fluids introduced through the introduction ports and transmits the pressure difference as a detection signal to the circuit board. Alternatively, in some embodiments, the physical quantity measuring device according to the invention is in a form of a temperature measuring device in which the detector is a bimetal component that detects a temperature and transmits a temperature change as a detection signal to the circuit board.

In the above exemplary embodiment, the physical quantity measuring device is attached to the attachment target with the detector 3 being located lower than the cover 5. However, in some embodiments, the cover 5 is located lower than the detector 3, or the detector 3 and the cover 5 are located obliquely or horizontally.

Further, in some embodiments, the case threaded portion 22 is an internal thread and the cover threaded portion 52 is an external thread.

Moreover, it is only necessary that the cover 5 is different from the inner case 2 in hardness. In some embodiment, the hardness of the inner case 2 is higher than that of the cover 5.

Further, the shape of the gasket 251 is not limited to the structure in the above exemplary embodiment. Any shape of the gasket covering the opening of the communication hole 11A is applicable. For instance, in some embodiments, the gasket is a simply annular component.

What is claimed is:

1. A physical quantity measuring device comprising:
   an outer case comprising a bottom and a cylindrical body provided to a peripheral portion of the bottom;
   an inner case that is made of a synthetic resin and is provided inside the outer case;
   a detector that is provided to the bottom and configured to detect a physical quantity;
   a terminal base comprising a terminal configured to transmit a signal from the detector to an outside;
   a cover configured to cover an opening of the outer case and having a different hardness from that of the inner case;
   a cable having a first end connected to the terminal and a second end; and
   a cylindrical cable drawing portion drawing out the second end of the cable and projecting from a circumferential surface of the outer case,
   the inner case comprising: a case threaded portion; and a terminal base setting portion on which the terminal base is set,
   the detector comprising: a bottom connector connected to the bottom; and a joint attachable to an attachment target, and
   the cover comprising: a cover body configured to cover the terminal base setting portion; and a cover threaded portion provided to the cover body and configured to be screwed with the case threaded portion.

2. The physical quantity measuring device according to claim 1, wherein
   the detector is attached to the attachment target while the joint is located at a lower position and the bottom connector is located at a higher position, and
   the cable drawing portion is attached to the outer case in a manner to be inclined downward from a base end to a distal end thereof.

3. The physical quantity measuring device according to claim 1, wherein
   the inner case and the outer case define a space therebetween, and
   a seal member is located surrounding a communication hole that communicates with the bottom connector formed on the bottom.

4. The physical quantity measuring device according to claim 3, wherein
   the seal member comprises an annular gasket located adjacent to the communication hole.

5. The physical quantity measuring device according to claim 1, wherein
   the inner case comprises a guide configured to guide a first end of the cable from an inside of the cable drawing portion to the terminal.

6. The physical quantity measuring device according to claim 1, wherein
   the detector comprises: a cylindrical case having a first end provided to the bottom connector and a second end provided to the joint; a sensor that is provided to the joint and is configured to detect a physical quantity of a measurement target fluid to be introduced from an introduction port formed on the joint; and a circuit board that is provided inside the cylindrical case and is configured to receive a detection signal from the sensor and transmit the detection signal to the terminal.

7. The physical quantity measuring device according to claim 6, wherein
the outer case, the cable drawing portion and the cylindrical case are metallic,
an O-ring is provided between the cover and the inner case, and
the outer case is welded to the cylindrical case and the outer case is welded to the cable drawing portion.

8. The physical quantity measuring device according to claim 1, wherein
the cover body is connected to the cable drawing portion with a chain.

9. The physical quantity measuring device according to claim 8, wherein
the chain comprises: a chain body comprising a first end connected to the cable drawing portion and a second end; a first engaging portion connected to the second end of the chain body; and a ring connected to the first engaging portion, and
the ring comprises: an elastic arc portion that is engageable with a groove formed along a circumferential direction of the cover body; and second engaging portions that are respectively provided to open ends of the arc portion and are engageable with the first engaging portion.

* * * * *